(12) United States Patent
Harper et al.

(10) Patent No.: US 9,420,349 B2
(45) Date of Patent: Aug. 16, 2016

(54) METHODS AND SYSTEMS FOR MONITORING A MEDIA STREAM AND SELECTING AN ACTION

(71) Applicant: Ensequence, Inc., Portland, OR (US)

(72) Inventors: Jeffrey Todd Harper, Tualatin, OR (US); Larry Alan Westerman, Portland, OR (US); Mark-Andrew Ray Tait, Beaverton, OR (US)

(73) Assignee: Ensequence, Inc., Portland, OR (US)

( * ) Notice: Subject to any disclaimer, the term of this patent is extended or adjusted under 35 U.S.C. 154(b) by 88 days.

(21) Appl. No.: 14/184,367

(22) Filed: Feb. 19, 2014

(65) Prior Publication Data

US 2015/0237409 A1  Aug. 20, 2015

(51) Int. Cl.
| | |
|---|---|
| H04H 60/37 | (2008.01) |
| H04N 21/8352 | (2011.01) |
| H04N 21/6543 | (2011.01) |
| H04N 21/81 | (2011.01) |
| H04N 21/44 | (2011.01) |
| H04N 21/234 | (2011.01) |
| H04N 21/434 | (2011.01) |
| H04N 21/462 | (2011.01) |

(52) U.S. Cl.
CPC ..... *H04N 21/6543* (2013.01); *H04N 21/23418* (2013.01); *H04N 21/23424* (2013.01); *H04N 21/4348* (2013.01); *H04N 21/44008* (2013.01); *H04N 21/4622* (2013.01); *H04N 21/812* (2013.01); *H04N 21/8352* (2013.01)

(58) Field of Classification Search
USPC ........................................................ 705/26.9
See application file for complete search history.

(56) References Cited

U.S. PATENT DOCUMENTS

| | | | |
|---|---|---|---|
| 6,968,337 B2 | 11/2005 | Wold | |
| 7,529,659 B2 | 5/2009 | Wold | |
| 7,877,438 B2 | 1/2011 | Schrempp | |
| 7,881,931 B2 | 2/2011 | Wells | |
| 8,082,150 B2 | 12/2011 | Wold | |
| 8,112,818 B2 | 2/2012 | Wold | |
| 8,140,331 B2 | 3/2012 | Lou | |
| 8,489,884 B2 | 7/2013 | Srinivasan | |
| 8,571,864 B2 | 10/2013 | DeBusk | |
| 8,620,772 B2 * | 12/2013 | Owen | 705/26.9 |
| 9,113,202 B1 * | 8/2015 | Wiseman et al. | H04L 7/08 |
| 2006/0149533 A1 | 7/2006 | Bogdanov | |
| 2006/0149552 A1 | 7/2006 | Bogdanov | |
| 2007/0127717 A1 | 6/2007 | Herre | |
| 2013/0044885 A1 | 2/2013 | Master | |
| 2013/0226957 A1 | 8/2013 | Ellis | |

* cited by examiner

*Primary Examiner* — Kieu Oanh T Bui (74) *Attorney, Agent, or Firm* — Kristine Elizabeth Matthews (57) ABSTRACT

Aspects of the present invention are related to systems, methods and apparatus for selecting an action when known content is detected in a media stream.

17 Claims, 4 Drawing Sheets

METHODS AND SYSTEMS FOR MONITORING A MEDIA STREAM AND SELECTING AN ACTION

FIELD OF THE INVENTION

Embodiments of the present invention relate generally to methods and systems for monitoring a media stream and selecting an action and, in particular, to methods and systems for monitoring a media stream and selecting an action using a media-content fingerprint.

BACKGROUND

An ability to provide viewer-selectable interactivity and other actions in conjunction with still-image, audio and/or video content may be a desirable capability in a broadcast system. A required capability in a system intended for this purpose may be an ability to control activity during discontinuities in program content, for example, commercial breaks, emergency broadcast interruptions, and other program-content discontinuities. Existing systems for providing viewer-selectable interactivity in conjunction with still-image audio and/or video content may be problematic in many broadcast environments because of existing systems' reliance on specific signaling content in the broadcast stream. No standardized method for conveying such signals is provided across the multiple broadcast methodologies, for example, cable, terrestrial, satellite, Internet Protocol, and other broadcast methodologies, that may be used to distribute program content. Furthermore, signals that are introduced into a broadcast stream at one point in a distribution chain may be modified or removed at a later point in the processing of the broadcast stream prior to reception by the viewer. Additionally, the insertion of commercial content into program content may vary with respect to the timing, duration and identity of the commercial content during each unique broadcast of a particular piece of program content and for each method of broadcast of the program content. Due to this variability, existing systems may require control signals be inserted specifically for each presentation of the program content.

Existing still-image/audio/video content recognition systems may receive still-image/audio/video input and perform a specified action appropriate to the identity of the still-image/audio/video content. Existing systems may fail to perform actions when still-image/audio/video content identification cannot disambiguate between two or more sources, for example when two or more still-image/audio/video reference sources share substantially identical content.

Methods and systems that monitor still-image/audio/video content and select a specified action to perform when still-image/audio/video content identification identifies two or more possible still-image/audio/video sources as substantially identical may be desirable.

SUMMARY

Some embodiments of the present invention relate to methods, systems and apparatus for monitoring a media stream and performing an action by receiving a plurality of media objects, each media object comprising an initial content portion that is substantially identical to the initial content portion of each of the other media objects in the plurality of media objects and a subsequent content portion unique to the each media object; associating an action with the plurality of media objects; receiving a media stream comprising one of the plurality of media objects; detecting that the media stream contains the substantially identical portion shared by each of the media objects in the plurality of media objects; and selecting the action associated with the plurality of media objects.

One aspect of the present invention teaches creating a set of reference fingerprints for each of the media objects in a plurality of media objects; associating a unique fingerprint-media-object identifier with each of the media objects in the plurality of media objects; adding each of the reference-fingerprint sets in the plurality of reference-fingerprint sets to a fingerprint database; providing the fingerprint database to a fingerprint identifier; creating a fingerprint from a portion of the content of a received media stream; transmitting the fingerprint to the fingerprint identifier; and receiving from the fingerprint identifier a response comprising a plurality of fingerprint-media-objects identifiers identifying each of the plurality of media objects.

Another aspect of the present invention further teaches receiving a first media object; the first media object not sharing any substantially identical content with the media objects in the plurality of media objects; associating a first action with the first media object; receiving a media stream comprising in part the first media object; detecting that the media stream comprises the first media object; and performing the first action associated with the first media object.

Yet another aspect of the present invention further teaches creating a first set of reference fingerprints for the first media object; associating a unique first fingerprint-media-object identifier with the first media object; adding the first set of reference fingerprints to a fingerprint database; providing the fingerprint database to a fingerprint identifier, creating a fingerprint from a portion of the content of the received media stream; transmitting the fingerprint to the fingerprint identifier; and receiving from the fingerprint identifier a response comprising a media identifier identifying the first media object.

Yet another aspect of the present invention teaches receiving a media stream; generating a fingerprint from a portion of the content of the media stream; transmitting the fingerprint to a media identifier system; receiving from the media identifier system a response comprising a plurality of media identities matching the fingerprint; and selecting an action appropriate to all of the media identities.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

As used herein, the term "media object" refers to a body of still-image content, audio content and/or video content. The still-image, audio and/or video content may be conveyed in analog form, for example as a frequency-modulated radio-frequency electromagnetic wave. Alternatively, the still-image, audio and/or video content may be conveyed in digital form, for example as a stream of numerical values constituting a Moving Picture Experts Group (MPEG) transport stream or, as a further example, as a stream of numerical values constituting a still image. The representation of the content of a media object may be ephemeral or durable. When the representation is durable, for example, as a compact disc encoding audio content, the content is to be recognized as distinct from the physical medium embodying the content.

As used herein, the term "media stream" refers to one or more sequences of one or more media objects, conveyed in analog or digital form.

As used herein, the terms "program" and "program content" refer to set of one or more media objects intended to be consumed by a viewer as a unified entity for entertainment, diversion, information, education, or other viewer-related purposes. Program content may be produced by a "programmer," for example, an individual, a group, a commercial company, a non-profit organization, and other program-content-production entity. A "series" is a set of programs that share common thematic, stylistic, and/or structure elements, and that are intended to be consumed as an artistic whole. Each of the set of programs in a series is an "episode" of the series.

As used herein, the phrase "secondary content" refers to non-program media objects, for example, advertisements, news items, public service announcements, station identification spots, and other non-program content. In a broadcast system, program content may be presented in a discontinuous fashion with various objects of secondary content interleaved within the program content.

As used herein, the phrase "supplementary content" refers to at least one of audio, video, still images, text, executable code, and other data intended for utilization with primary content, for example, program content and secondary content. Supplementary content may be associated with program content or with secondary content. Supplementary content may encode or define an action to be performed. Alternatively, supplementary content may be distributed with primary content, wherein the distribution constitutes an action.

As used herein, the phrase "media content" refers to the content of a media object, which may comprise either program content or secondary content.

As used herein, the phrase "program stream" refers to a sequence of analog or digital data comprising program and secondary content, and possibly including supplementary content.

As used herein, the phrase "broadcast stream" refers to an aggregation of one or more program streams.

As used herein, the terms "broadcast" and "broadcasting" refer to the process of aggregating program content, secondary content, and possibly supplementary content into at least one program stream, aggregating one or more program streams into a broadcast stream, and delivering the broadcast stream to one or more entities. Elements of program, secondary, and supplementary content may be inserted, removed, modified, or replaced during the generation and manipulation of a program stream. A "broadcaster" is an entity that operates a broadcast system.

As used herein, the terms "distribute" and "distribution" refer to the process of delivering a broadcast stream to viewers through a physical delivery network. The physical delivery network may utilize wired, wireless, or a combination of wired and wireless means. A "distributor" is an entity that operates a distribution system. A broadcast stream may be modified during distribution by inserting, removing, modifying, or replacing elements of one or more program streams within the broadcast stream.

As used herein, the terms "interactive" and "interactivity" refer to the capability, in a viewing environment, for a viewer to control the presentation of program, secondary, and/or supplementary content through direct or indirect manipulation of an interface through a remote control, mouse, keyboard, touch panel, movement recognition camera, microphone and other interface mechanisms.

As used herein, the term "fingerprint" refers to a value or set of values computed as a condensed mathematical representation of the information contained within some subset of the still-image, audio and/or video content of a media object.

As used herein, the phrase "substantially identical," when applied to all or a portion of each of two media objects, means that, to a human observer, the relevant portions of the media objects appear identical, are perceived as identical or otherwise cannot be differentiated, and that, to a media identifier system, the relevant portions of the media objects cannot be distinguished and would be identified as being all, or a portion of, the same media object.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

The steps of the flowcharts described herein may be performed by software executing on hardware, by specialized hardware systems, or by a combination of software and specialized hardware. Certain steps of the flowcharts may be amenable to manual performance, but in general the flowcharts represent processes or operations that require hardware systems for their realization.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

Figure 1:
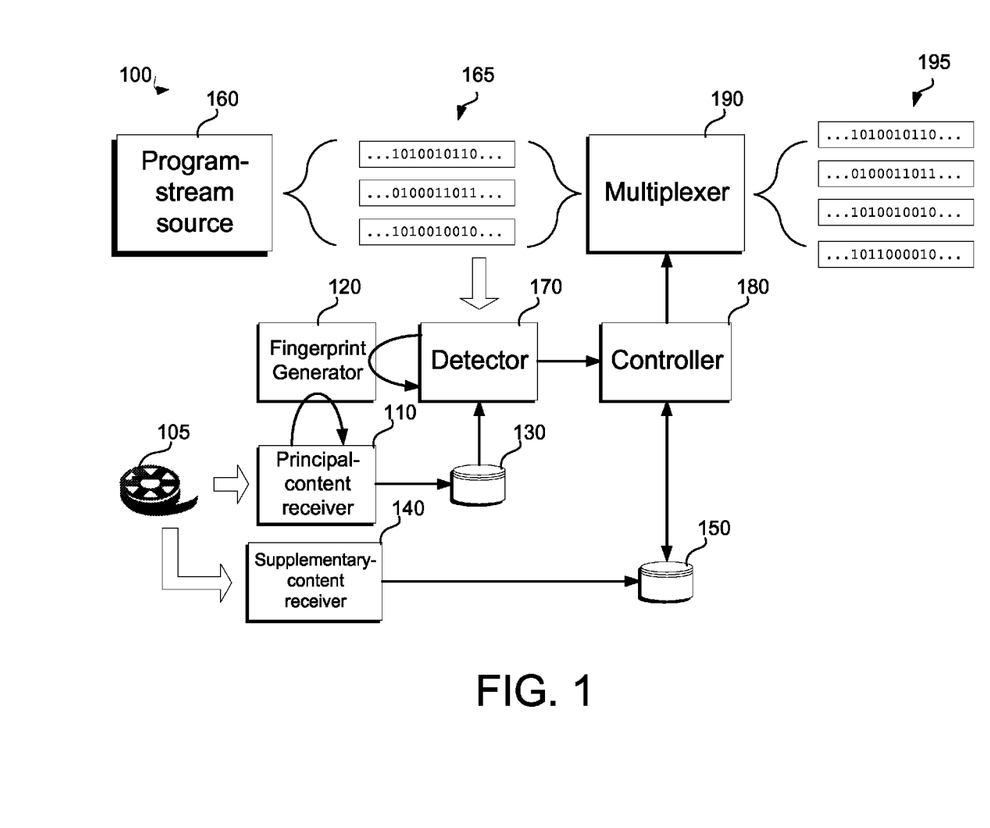
FIG. 1 depicts an exemplary system for practicing an aspect of embodiments of the present invention.

FIG. 1 depicts elements of an exemplary system 100 for practicing an aspect of the present invention. A content source 105 may provide program and/or secondary content comprising one or more media objects to a principal-content receiver 110. When a media object comprising still-image, audio and/or video content is received at the principal-content receiver 110, either of, any two of, or all three of the still-image, the audio and the video content may be passed to a fingerprint generator 120, whereat one or more reference fingerprints associated with the media object may be generated according to a fingerprint-generation method known in the art. In alternative embodiments, a content source 105 may provide the one or more reference fingerprints directly to a principal-content receiver 110. The resulting one or more reference fingerprints may be stored in a fingerprint database 130. A unique fingerprint-media-object identifier may associate the one or more reference fingerprints with the media object from which they were generated. Content source 105 also may provide supplementary content to a supplementary-content receiver 140. The supplementary content may be stored in a supplementary-content database 150, along with a unique supplementary-content-media-object identifier that may associate the supplementary content with the media object. In some embodiments of the present invention, the unique fingerprint-media-object identifier used within the fingerprint database 130 to associate the one or more reference fingerprints with the media object from which they were generated may be the same as the unique supplementary-content-media-object identifier used within the supplementary-content database 150 to associate the supplementary content with the media object. In alternative embodiments, these identifiers may be distinct but associated with each other. The supplementary content may specify an action to be taken when media content is recognized in a broadcast stream 165 created from a program-stream source 160. Exemplary actions include providing a Universal Resource Locator (URL) of a related web page; presenting related web-page content; providing biographical information about an artist associated with the media content; providing performance schedule information, for example, future concert dates, future concert venues and other schedule information, about an artist associated with the media content; displaying images related to the media content; providing a playlist of related songs, movies and/or television episodes; providing coupons for related media content; providing a social-media tag, for example, a hash-tag and other social-media tags, related to the artist and/or media content; providing recent social-media content, for example, tweets related to the media content and/or artist; and posting the identity of the artist to a social-media website, for example, Facebook and other social-media websites. When the identified media content is one of several possible episodes of a unique television series, further exemplary actions may include providing a schedule for future episodes of the series; playing related media content, for example, a promotion for the series and other related media content; creating record events to record future episodes of the series when broadcast; and creating reminder events to notify when future episodes of the series are broadcast.

A portion of the broadcast stream 165 may be monitored by a detector 170. The detector 170 may pass either of, any two of, or all three of the still-image content, the audio content and video content from the broadcast stream to the fingerprint generator 120. The resulting fingerprints generated from the broadcast stream may be compared with the one or more reference fingerprints from the fingerprint database 130. When a match is found, the detector 170 may produce a first control signal that may be passed to a controller 180, along with the unique fingerprint-media-object identifier associated with the matched reference fingerprint. Upon receiving the first control signal, the controller 180 may use the unique fingerprint-media-object identifier to extract supplementary content associated with the principal content from supplementary-content database 150, and the controller 180 may activate a multiplexer 190 to insert the extracted supplementary content into the broadcast stream 165, thereby producing an enhanced broadcast stream 195. In an exemplary embodiment, the supplementary content may be an interactive application associated with the primary content. Once a match has been found, the detector 170 continues to monitor the broadcast stream 165, generating fingerprints and comparing the generated fingerprints with the one or more reference fingerprints from the fingerprint database 130. When the detector 170 fails to find a match, the detector 170 may generate a second control signal that may be passed to the controller 180. Upon receiving the second control signal, the controller 180 may deactivate the multiplexer 190 to no longer insert the extracted supplementary content into the enhanced broadcast stream 195.

Exemplary system 100 in FIG. 1 incorporates detector 170 which performs a specific action upon recognition of primary content within program stream 165, namely communicating with controller 180 to accomplish the injection of supplementary content from database 150 into broadcast stream 165.

Figure 2:
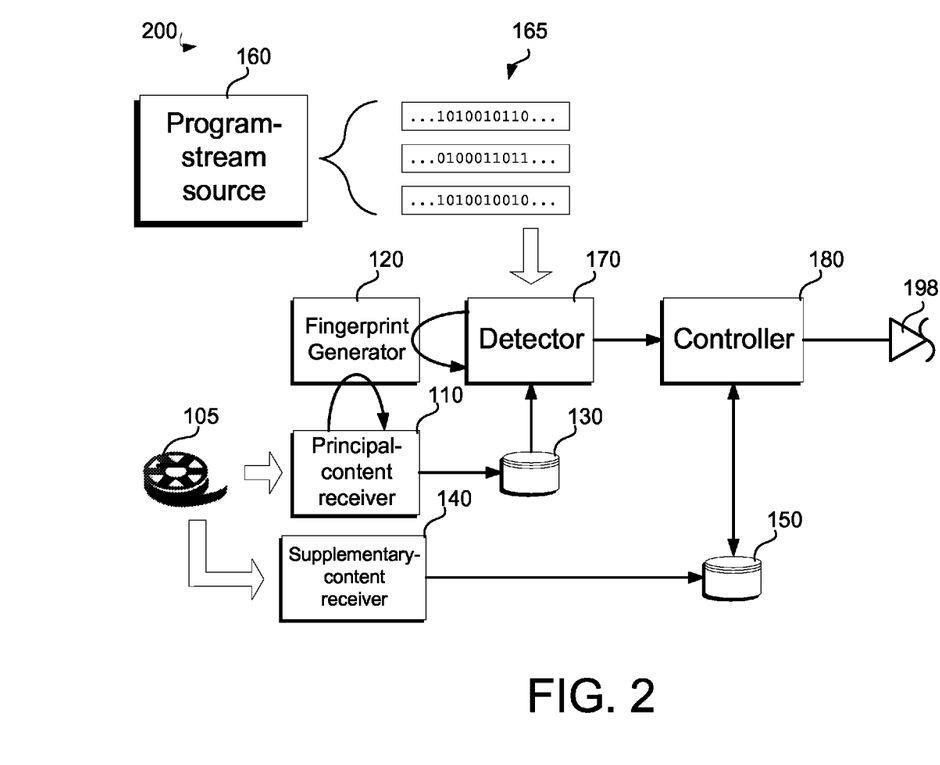
FIG. 2 depicts an alternative embodiment of an exemplary system for practicing an aspect of embodiments of the present invention.

FIG. 2 depicts an alternative exemplary embodiment of a system 200 configured to practice an aspect of the present invention. In FIG. 2, controller 180 may perform an action through an external controller 198. The action may be any action relevant to the occurrence of recognized content within broadcast stream 165. For example, controller 180 may provide metadata to an external logging system upon recognition of a specific piece of content within broadcast stream 165, the metadata being retrieved from supplementary content database 150. The action performed through an external controller 198 may be specified by supplementary content stored in supplementary-content database 150.

Figure 3:
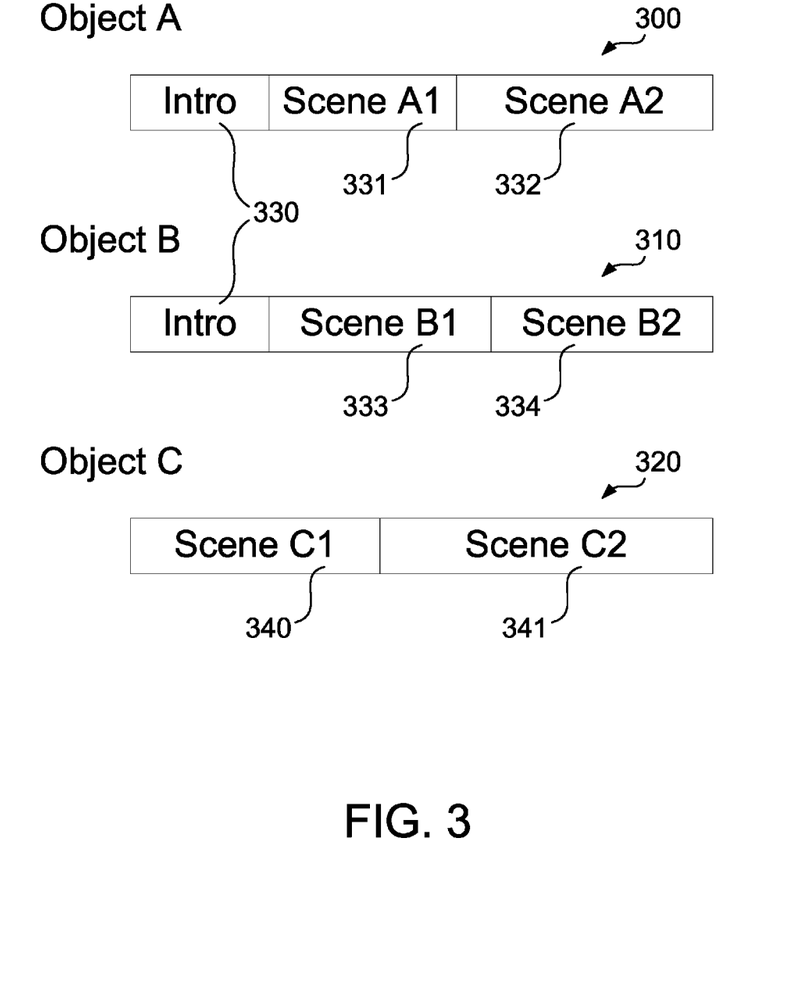
FIG. 3 depicts three media objects that comprise a shared, substantially identical content element and unique content elements.

Some instances of principal content may not allow for unique identification by system 100, 200. FIG. 3 shows an exemplary case of three media objects 300, 310, 320, two media objects 300, 310 that share a substantially identical introductory section, but differ in later portions of the content, and a third media object 320 differing from both other media objects 310, 320. In this example, media object A 300 comprises substantially identical introductory section 330, a first scene A1 331, and a second scene A2 332. Media object B 310 comprises substantially identical introductory section 330, a first scene B1 333, and a second scene B2 334. Because media object A 300 and media object B 310 share a substantially identical introductory section 330, any fingerprints generated from the substantially identical introductory section 330 could not be used to differentiate between the two pieces of content 300, 310. This situation arises because a media identification system, when presented with the content of media object 300 or media object 310, cannot determine whether introductory section 330 arises from media object A 300 or media object B 310, and so may provide a multiple identification naming both media object A 300 and media object B 310. However, the fingerprints for the substantially identical introductory section 330 could be used to differentiate either media object A 300 or media object B 310 from media object C 320, which comprises a first scene C1 340 and a second scene C2 341.

In accordance with an aspect of the present invention, an embodiment of exemplary system 100 may receive two or more media objects 300, 310 comprising principal content, the initial content portion 330 of which is substantially identical among the two 300, 310 or more media objects, wherein the two or more media objects 300, 310 may be associated with a single instance of supplementary content received at supplementary content receiver 140. The two or more media objects 300, 310 may be provided to the fingerprint generator 120, and the resulting sets of one or more reference fingerprints may be stored in fingerprint database 130. The commonly-associated supplementary content may be stored in supplementary content database 150 and may be associated with each of the two or more unique fingerprint-media-object identifiers used within the fingerprint database 130 to identify the two or more sets of one or more fingerprints generated from the two or more media objects 300, 310. In this embodiment, detector 170 may receive a portion of broadcast stream 165, pass either of, any two of, or all three of still-image content, audio content and video content from the broadcast stream to the fingerprint generator 120, and compare the resulting fingerprints with the two or more sets of one or more reference fingerprints from the fingerprint database 130. Detector 170 may find a multiple match, wherein the resulting fingerprints match reference fingerprints from two or more sets of reference fingerprints. Detector 170 may provide the multiple match data to controller 180, and controller 180 may use the two or more unique fingerprint-media-object identifiers to determine that supplementary content database 150 contains a single instance of supplementary content associated with all of the two or more unique fingerprint-media-object identifiers. In this circumstance, controller 180 may activate a multiplexer 180 to insert the extracted supplementary content into the broadcast stream 165, thereby producing an enhanced broadcast stream 195. In an exemplary embodiment, the supplementary content may be an interactive application appropriate to each of the two or more media objects 300, 310. In an alternative embodiment 200, controller 180 may perform an action appropriate to the two or more unique fingerprint-media-object identifiers through an external controller 198.

Once a multiple match has been found, the detector 170 may continue to monitor the broadcast stream 165, generating fingerprints and comparing the generated fingerprints with the two or more sets of one or more reference fingerprints from the fingerprint database 130. During this period, detector 170 may find single or multiple matches within the two or more sets of one or more reference fingerprints from the fingerprint database 130. When the detector 170 fails to find any match, the detector 170 may generate a second control signal that may be passed to the controller 180. Upon receiving the second control signal, the controller 180 may deactivate the multiplexer 190 to no longer insert the extracted supplementary content into the enhanced broadcast stream 195.

As an example of how the system 100 of FIG. 1 or the system 200 of FIG. 2 might be utilized, a multiple systems operator (MSO) may desire to distribute an interactive application on a broadcast channel whenever one of a series of promotional commercials is aired. The schedule for airing the commercials may not be known to the MSO. The system 100 may be deployed in the MSO central distribution center, where a broadcast stream may be monitored to identify when content from one of the series of promotional commercials occurs. Some of the commercials may share a substantially identical introductory section, whereas others of the commercials may be entirely unique in their content. When the broadcast stream content is fingerprinted and the fingerprints forwarded to a fingerprint detector 170, multiple or single matches may be found, depending on whether a specific commercial being aired does or does not share substantially identical content with other commercials in the set. Regardless of whether multiple or single matches are found, the same interactive application may be incorporated into the broadcast stream for reception and execution at viewer premises. The current invention accomplishes this task as described herein.

The systems 100, 200 depicted in FIG. 1 and FIG. 2 are intended to be exemplary, and one skilled in the art will recognize that many details and aspects of systems 100, 200 could be modified or altered without departing from the spirit and scope of the present invention. For example, in some embodiments of the present invention, principal content and supplementary content may come from the same source 105. In alternative embodiments, principal content and supplementary content may come from different sources (not shown). In some embodiments of the present invention, principal content and/or supplementary content may be received in tangible form. In alternative embodiments, principal and/or supplementary content may be received in intangible and evanescent form. In some embodiments of the present invention, content may be transported via physical media, for example, tape, disk, memory card, and other physical transportation means. In alternative embodiments of the present invention, content may be provided as evanescent digital or analog signals transmitted via wired or wireless communication means.

In some embodiments of the present invention, the fingerprint generator 120 may be realized as a single system accessible to both the principal-content receiver 110 and the detector 170. In alternative embodiments of the present invention (not shown), the fingerprint generator 120 may be realized as two separate implementations of fingerprint generator instances operating at different locations. In some embodiments of the present invention, the process of generating and storing reference fingerprints may occur at a time and/or place distinct from the time and/or place of the operation of the detector 170. The reference fingerprint database 130 for storing reference fingerprints may be implemented as a flat file stored on a physical medium, as a relational database implemented on a central server computer, as a virtual database implemented using cloud storage techniques, or by other equivalent methods well known in the art. Similarly, the supplementary-content database 150 may be implemented as a flat file, as a relational database, as a virtual database, or by other data storage and retrieval means well known in the art. In some embodiments of the present invention, the principal-content receiver 110 and supplementary-content receiver 140 may be realized as a single module. In alternative embodiments, the principal-content receiver 110 and the supplementary-content receiver 140 may be realized as separate modules. In some embodiments of the present invention, the fingerprint database 130 and the supplementary-content database 150 may be realized as separate databases. In alternative embodiments of the present invention, the fingerprint database 130 and the supplementary-content database 150 may be realized as a single database. The unique identifier associated with principal content and supplementary content may be provided by content source 105, or may be generated by principal content receiver 110, by supplementary content receiver 140, or by a separate unique identifier generator (not shown).

In some embodiments of the present invention, the program-stream source 160 may be a singular entity. In alternative embodiments, the program-stream source 160 may be multiple entities, each providing one or more content streams. The program stream 165 may be communicated via a wired or wireless network, and the program stream 165 may be communicated in digital or analog representation. The detector 170 and the controller 180 may be located in proximity to, or distant from, the program stream source 160, and/or the multiplexer 190, and/or each other. Monitoring of the program stream 165 may be performed by any of the well-known monitoring means known in the art, for example, electronic sampling; reception of unicast, multicast, or broadcast internet protocol traffic on a wired or wireless digital network; antenna reception of wireless electromagnetic signals; and other means known in the art. Communication between the detector 170 and the controller 180, and between the controller 180 and the multiplexer 190, may be by any conventional wired or wireless means known in the art.

While FIG. 1 and FIG. 2 depict only a single instance of each element of system 100, 200 this is not a limitation of the present invention. In alternative embodiments, other system topologies may be utilized that fall within the spirit and scope of the present invention. For example, a principal-content receiver 110 may communicate with multiple fingerprint generators (one shown) 120; likewise, multiple principal-content receivers (one shown) 110 may communicate with a single fingerprint generator 120. A principal-content receiver 110 may store fingerprints in multiple fingerprint databases (one shown) 130; likewise, multiple principal-content receivers (one shown) 110 may store fingerprints in a single fingerprint database 130. A supplementary-content receiver 140 may store supplementary content in multiple supplementary-content databases (one shown) 150; likewise, multiple supplementary-content receivers (one shown) 140 may store supplementary content in a single supplementary-content database 150. A detector 170 may communicate with a multiple fingerprint generators (one shown) 120; likewise multiple detectors (one shown) 170 may communicate with a single fingerprint generator 120. A detector 170 may communicate with multiple fingerprint databases (one shown) 130; likewise, multiple detectors (one shown) 170 may communicate with a single fingerprint database 130. A controller 180 may communicate with multiple supplementary-content databases (one shown) 150; likewise, multiple controllers (one shown) 180 may communicate with a single supplementary-content database 150. A detector 170 may monitor multiple program streams (one shown) 165; likewise, multiple detectors (one shown) 170 may monitor a single program stream 165. A detector 170 may communicate with a multiple controllers (one shown) 180; likewise, multiple detectors (one shown) 170 may communicate with a single controller 180. A controller 180 may communicate with multiple multiplexers (one shown) 190; likewise multiple controllers (one shown) 180 may communicate with a single multiplexer 190. The insertion of supplementary content may be performed multiple times on a single program stream, in parallel, in series, or as a combination of series and parallel operations. A controller 180 may communicate with multiple external controllers (one shown) 198; likewise, multiple controllers (one shown) 180 may communicate with a single external controller 198. The foregoing list is not intended to be exhaustive of the possible alternative embodiments of system 100, but is exemplary of a range of implementations that fall within the spirit and scope of the present invention.

Figure 4:
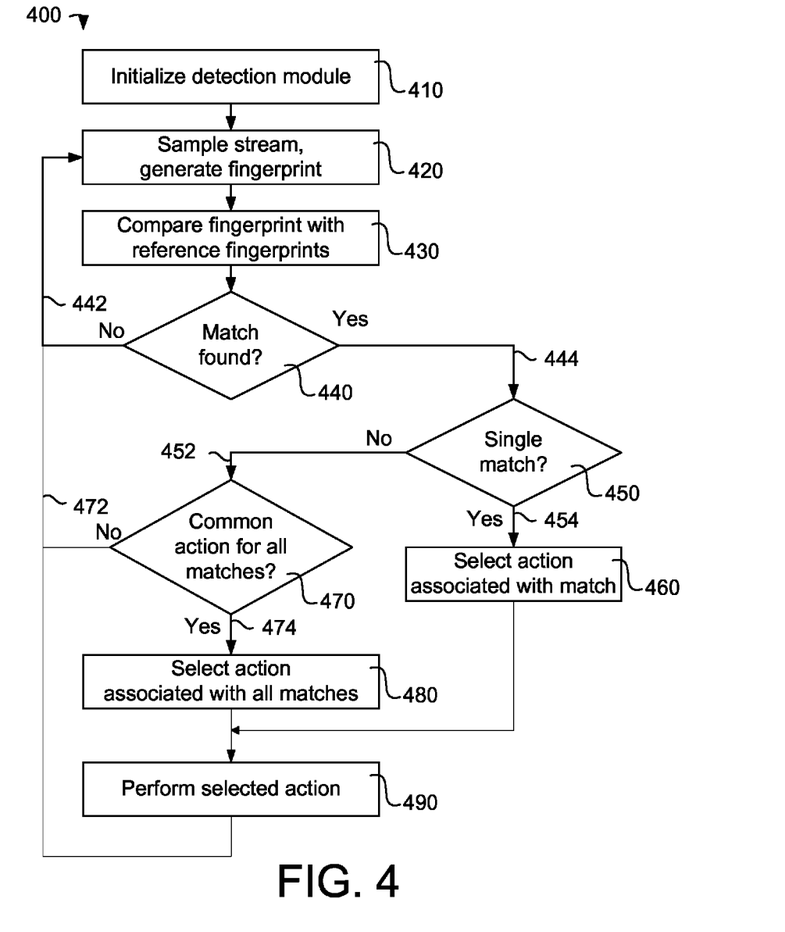
FIG. 4 depicts a flowchart of an exemplary process for monitoring a media stream and performing actions according to an embodiment of the present invention.

FIG. 4 depicts a flowchart of an exemplary process 400, according to embodiments of the present invention, to be executed in a detector 170 of exemplary system 100, 200. At a step 410, the detection module may be initialized. At a further step 420, samples may be extracted from a broadcast stream 165, and a fingerprint may be generated from the samples, for example, by means of a fingerprint generator 120. The samples may be taken, for example, from a still-image stream, from a video stream, from an audio stream, or from both video and audio streams. The fingerprints, for example, may be computed from and may represent a single field of video, a single frame of video, a series of sequential audio samples, or other data taken from the broadcast stream. At a further step 430, the generated fingerprint may be compared with a plurality of reference fingerprints, for example, those extracted from a fingerprint database 130. At a further step 440, a determination may be made whether the generated fingerprint matches a reference fingerprint. If no match is found 442, execution may return to a step 420.

If at a step 440 a match is found 444, at a further step 450 a determination may be made whether the match is a single match. If the match is a single match 454, at a further step 460 an action that is associated with the single match may be selected. If at a step 450, a multiple match is found 452, at a further step 470, a determination may be made whether a common action is associated with all the multiple matches found at a step 430. If a common action is not associated with all the multiple matches 472, execution may return to a step 420. If a common action is associated with all the multiple matches 474, at a further step 480, an action that is associated with all the multiple matches may be selected. Following selection of an action at a step 460 or a step 480, at a step 490, a selected action may be performed. Following performance of the selected action at a step 490, execution may return to a step 420.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for monitoring a media stream and selecting an action, the method comprising:
   prior to receiving a media stream:
      receiving a plurality of media objects, each media object comprising a temporally first-received initial content section that is substantially identical to the temporally first-received initial content section of each of the other media objects in the plurality of media objects and a subsequently received content section unique to the each media object; and
      associating an action with the plurality of media objects;
   receiving a media stream comprising one of the plurality of media objects;
   detecting that the media stream comprises the substantially identical initial content section; and
   selecting the action associated with the plurality of media objects.

2. The method of claim 1, the method further comprising: performing the selected action.

3. The method of claim 1, the method further comprising:
creating a set of reference fingerprints for each of the media objects in the plurality of media objects, thereby producing a plurality of reference-fingerprint sets;
associating a unique fingerprint-media-object identifier with each of the plurality of media objects;
adding each reference-fingerprint set in the plurality of reference-fingerprint sets to a fingerprint database;
providing the fingerprint database to a fingerprint identifier;
generating a fingerprint from a portion of the content of the received media stream;
transmitting the fingerprint to the fingerprint identifier; and
receiving from the fingerprint identifier a response comprising a plurality of fingerprint-media-object identifiers identifying each of the media objects in the plurality of media objects.

4. The method of claim 1, the method further comprising:
receiving a first media object, the first media object not sharing any substantially identical content with the media objects in the plurality of media objects;
associating a first action with the first media object;
receiving a second media stream comprising the first media object;
detecting that the second media stream comprises the first media object; and
selecting the first action.

5. The method of claim 4, the method further comprising:
creating a set of reference fingerprints for the first media object;
associating a unique first fingerprint-media-object identifier with the first media object;
adding the set of reference fingerprints to a fingerprint database;
providing the fingerprint database to a fingerprint identifier;
generating a fingerprint from a portion of the content of the received second media stream;
transmitting the fingerprint to the fingerprint identifier; and
receiving from the fingerprint identifier a response comprising the first fingerprint-media-object identifier identifying the second media object.

6. The method of claim 1, wherein the action is an action selected from the group consisting of providing a URL of a related web page, presenting a related web-page content, providing a biographical information about an artist, providing a performance-schedule information, displaying an image, providing a playlist, providing a coupon, providing a social-media tag, providing a recent social-media content, posting an identity of an artist to a social-media website, providing a schedule for a future episode of a television series, playing a related media content, creating a record event to record a future episode of a television series and creating a reminder event to notify when a future episode of a television series is broadcast.

7. A method for monitoring a media content and selecting an action, the method comprising:
receiving a media stream;
generating a fingerprint from a portion of the content of the media stream;
transmitting the fingerprint to a media identifier system;
receiving from the media identifier system a response comprising a plurality of fingerprint-media-object identifiers associated with a plurality of media objects, wherein a reference fingerprint associated with each media object in the plurality of media objects substantially matches the fingerprint; and
selecting an action based on the plurality of fingerprint-media-object identifiers.

8. The method of claim 7, the method further comprising: performing the selected action.

9. The method of claim 7, wherein the selected action is an action selected from the group consisting of providing a URL of a related web page, presenting a related web-page content, providing a biographical information about an artist, providing a performance-schedule information, displaying an image, providing a playlist, providing a coupon, providing a social-media tag, providing a recent social-media content, posting an identity of an artist to a social-media website, providing a schedule for a future episode of a television series, playing a related media content, creating a record event to record a future episode of a television series and creating a reminder event to notify when a future episode of a television series is broadcast.

10. The method of claim 7, wherein the selecting an action based on the plurality of fingerprint-media-object identifiers comprises:
using each fingerprint-media-object identifier in the plurality of fingerprint-media-object identifiers to determine an associated supplementary content; and
when each of the associated supplementary contents is a single instance of supplementary content, selecting the action based on the single instance of supplementary content.

11. The method of claim 10 further comprising:
inserting the single instance of supplementary content into the received media stream,
thereby producing an enhanced broadcast stream.

12. The method of claim 10, wherein the selected action is an action specified in the single instance of supplementary content.

13. A system for monitoring a media stream and selecting an action, the system comprising:
a media object receiver module configured to receive a plurality of media objects comprising at least one of still-image content, audio content and video content, each media object comprising a temporally first-received initial content section that is substantially identical to the temporally first-received initial content section of each of the other media objects in the plurality of media objects and a subsequently received content section unique to the each media object;
an association module configured to associate an action with the plurality of media objects;
a media stream receiver module configured to receive a media stream comprising one of the plurality of media objects;
a detector module configured to detect that the media stream contains at least the the substantially identical initial content section; and
a selector module configured to select an action associated with each of the plurality of media content.

14. The system of claim 13, further comprising:
an execution module configured to perform the selected action.

15. The system of claim 13, wherein the action is an action selected from the group consisting of providing a URL of a related web page, presenting a related web-page content, providing a biographical information about an artist, providing a performance-schedule information, displaying an image, providing a playlist, providing a coupon, providing a social-media tag, providing a recent social-media content, posting an identity of an artist to a social-media website, providing a schedule for a future episode of a television series, playing a related media content, creating a record event to record a future episode of a television series and creating a reminder event to notify when a future episode of a television series is broadcast.

16. The system of claim 13, further comprising:
an identifier module configured to assign a unique fingerprint-media-object identifier to a media object.

17. The system of claim 16, the system further comprising:
a fingerprint module configured to compute a plurality of reference fingerprints from the content of a media object; and
a first database module configured to:
  receive the plurality of reference fingerprints and the unique fingerprint-media-object identifier;
  associate the plurality of reference fingerprints and the unique fingerprint-media-object identifier, and
  store and retrieve the plurality of reference fingerprints, the unique fingerprint-media-object identifier, and the association between the plurality of reference fingerprints and the unique fingerprint-media-object identifier;
wherein the detector module is further configured to:
  generate a first fingerprint from at least one of a received still-image content, a received audio content and a received video content in the media stream;
  compare the first fingerprint with the plurality of reference fingerprints retrieved from the first database module; and
  determine whether the first fingerprint matches one or more fingerprints in the plurality of reference fingerprint.

* * * * *